United States Patent Office 3,106,534
Patented Oct. 8, 1963

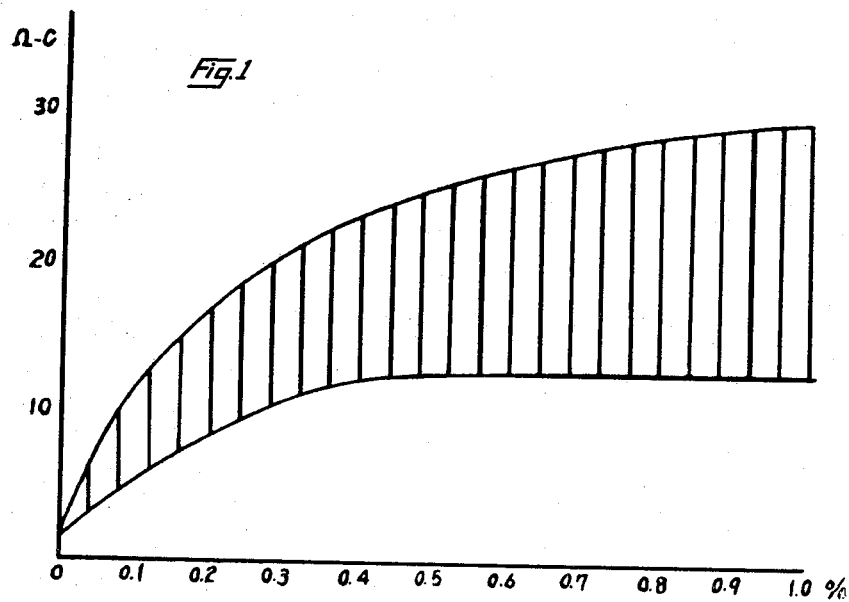
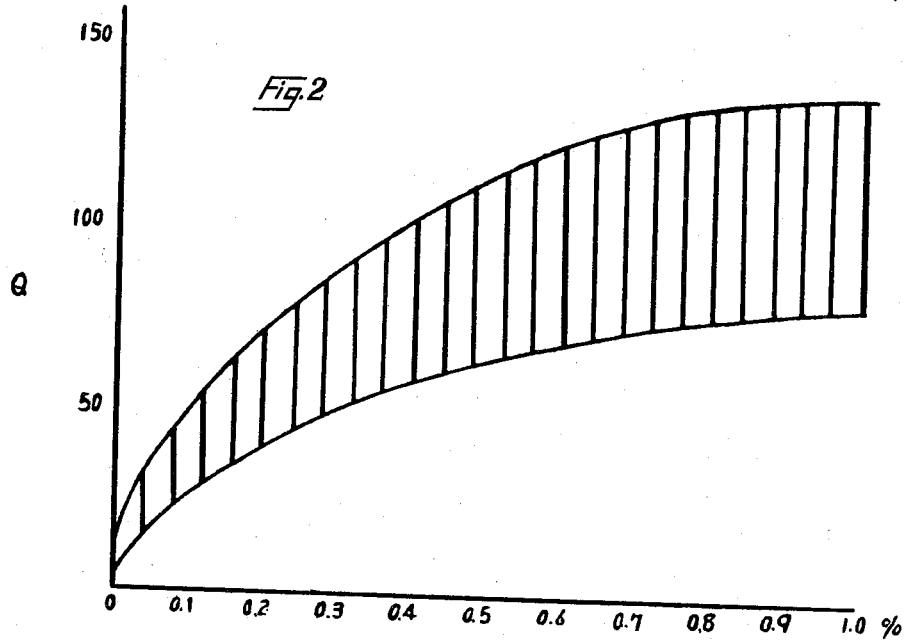

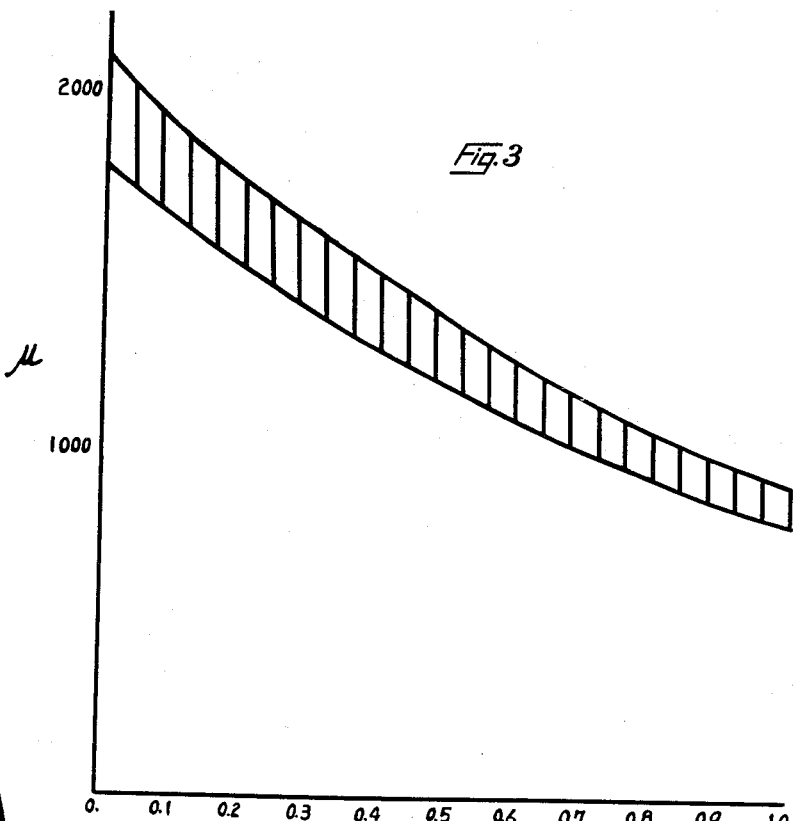
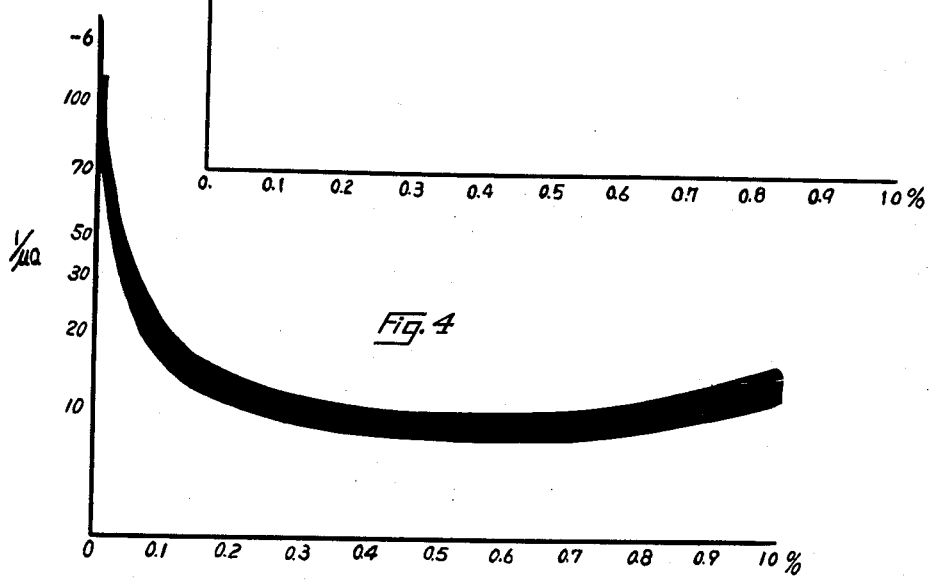

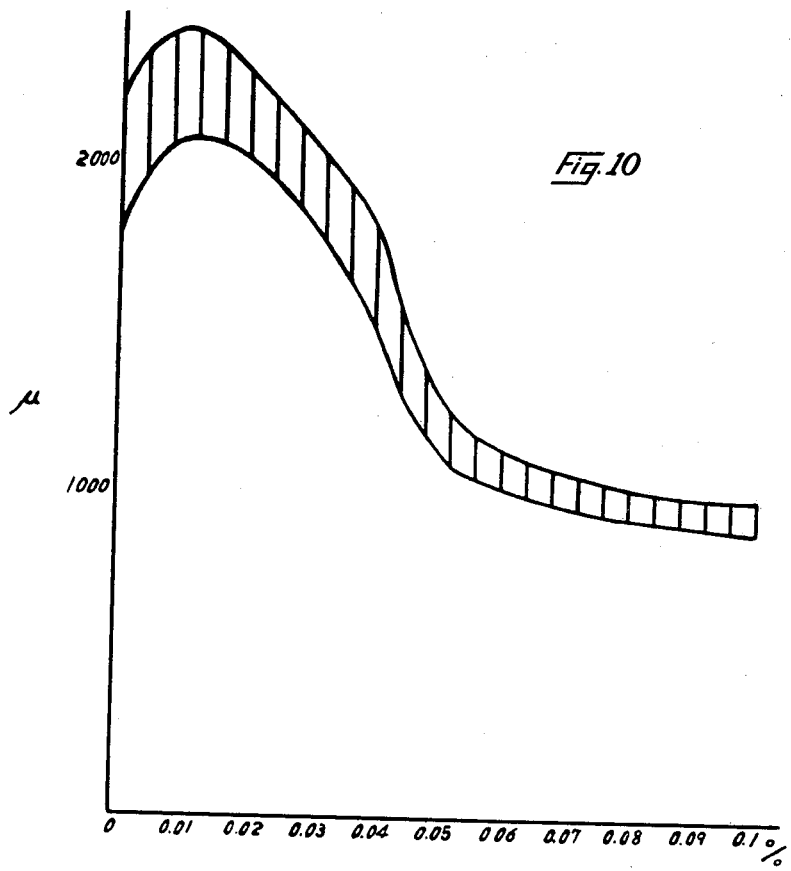
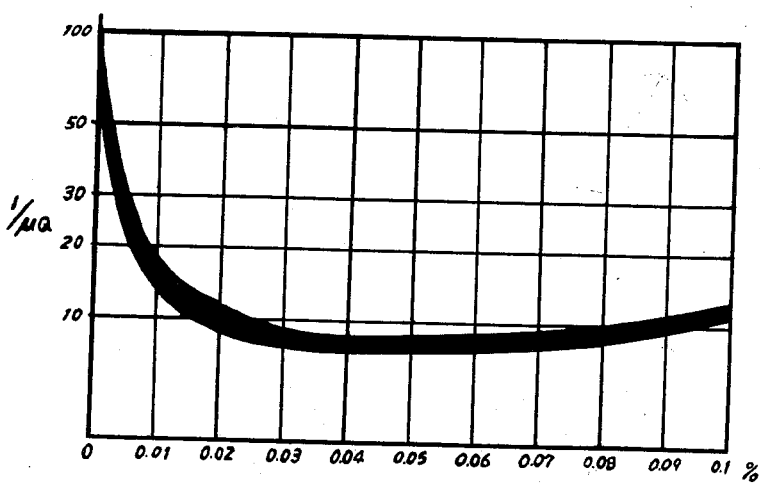

3,106,534
SOFT MAGNETIC FERRITE BODIES OF HIGH PERMEABILITY AND SMALL HYSTERESIS LOSSES
Tsuneo Akashi, Masao Tobita, Masao Takahashi, and Hideo Takamizawa, all of Tokyo, Japan, assignors to Nippon Electric Company, Ltd., Tokyo, Japan, a corporation of Japan
Filed Jan. 17, 1961, Ser. No. 83,332
Claims priority, application Japan Jan. 26, 1960
6 Claims. (Cl. 252—62.5)

This application is a continuation-in-part of our application Serial No. 4,728, filed January 26, 1960, and now abandoned.

This invention relates to soft magnetic ferrite material, and more particularly to such ferrite material especially adapted for use in electrical communication apparatus. As used herein, "soft" ferrite material means magnetic ferrite material of low magnetic retentivity.

As is known, manganese-zinc ferrites have desirable high-permeability characteristics for the communication field. To secure optimum operating results in the communication field, it is essential that such soft manganese-zinc ferrites shall combine (1) the highest possible permeability with (2) the lowest possible hysteresis losses. Heretofore, the permeability of such ferrites was increased by providing a composition of a low Curie point and by raising its sintering temperature. However, lowering of the Curie point of such ferrite composition restricts the range of its operating temperature, and an increase of its sintering temperature raises its hysteresis losses. Heretofore, manganese-zinc ferrites of best operating characteristics have been obtained by making them with the highest degree of purity. However, although such high-purity ferrites exhibit increased permeability, their hysteresis losses are not decreased, and remain excessive.

An object of the present invention is to obtain a soft magnetic material which combines high permeability with an extremely low hysteresis loss.

A further object of this invention is to obtain manganese-zinc ferrites exhibiting a lower $1/\mu Q$ than heretofore obtainable.

According to the invention, soft ferrite bodies of compositions consisting of,

| | Mol percent |
|---|---|
| $Fe_2O_3$ | 52 to 55 |
| MnO | 25 to 37 |
| ZnO | 23 to 8 | are given highest permeability and lowest hysteresis losses, by embodying in the composition 0.05% to 0.3% by weight of calcium oxide together with 0.005% to 0.035% by weight of silicon dioxide.

Throughout the specification and claims, all proportions are given by weight unless otherwise specified.

The objects of the present invention and the manner of attaining the same, will be more fully explained in the following description thereof, in which experimental results with conventional ferrites and with ferrites of the invention are given with reference to the accompanying drawings, in which:

FIG. 1 shows characteristic curves of the effect of calcium oxide additions only on the D.C. specific resistance of a manganese-zinc ferrite within the above-specified range;

FIG. 2 shows characteristic curves of the effect of calcium oxide additions only on the Q of such ferrite at 100 kilocycles per second;

FIG. 3 shows characteristic curves of the effect of calcium oxide additions on the $\mu$ of such ferrite;

FIG. 4 shows characteristic curves of the effect of calcium oxide additions only on $1/\mu Q$ of such ferrite;

FIG. 10 shows characteristic curves of the effect of silicon dioxide additions only on the $\mu$ of such ferrite;

FIG. 12 shows a characteristic curve showing the effect of silicon dioxide additions only on $1/\mu Q$ of such ferrite.

Figure 5:
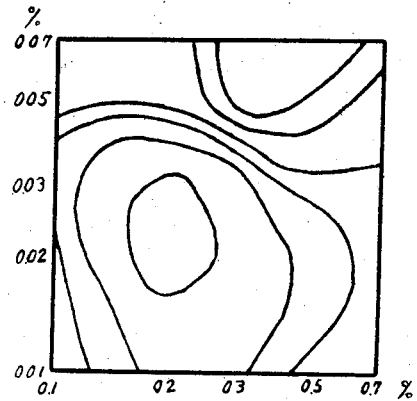
FIG. 5 shows characteristic curves of the effect of the combined additions of both silicon dioxide and calcium oxide on the specific electric resistance of such ferrite.

In order to show the results of high purification mentioned above, a series of experiments have been carried out. The row materials used in the experiments are as followings: iron oxide (manganese, zinc, and copper: below 0.001%; other impurities, not detectable) manufactured by thermal decomposition of ferrous oxalate which is obtained by dissolving electrolytic iron in special-grade sulfuric acid and then precipitating with special-grade ammonium oxalate; manganese carbonate (iron, zinc, copper, calcium and magnesium: below 0.001%; other impurities, not detectable) produced by dissolving electrolytic manganese into special-grade sulfuric acid and then precipitating with special-grade ammonium carbonate; and special-grade zinc oxide. The impurities in MnO and ZnO and of the manufacturing processes, were kept to a minimum. Some of the results are shown in Table 1.

Table 1

$\mu$ (3 milli-oersteds, 100 kc.)
Q (3 milli-oersteds, 100 kc.)
H (10–30 milli-oersteds, 100 kc.)
$1/\mu Q$ (3 milli-oersteds, 100 kc.)

| | Sintering temperature | | | | | | | |
|---|---|---|---|---|---|---|---|---|
| | 1,200° C. (in nitrogen gas) | | | | 1,250° C. (in nitrogen gas) | | | |
| Composition | Characteristic | | | | | | | |
| | $\mu$ | Q | $1/\mu Q$ ×10⁶ | $H/\mu^2$ ×10⁶ | $\mu$ | Q | $1/\mu Q$ ×10⁶ | $H/\mu^2$ ×10⁶ |
| $Fe_2O_3$, 54; MnO 35; ZnO 11 | 2,000 | 4.5 | 107 | 2,560 | 2,450 | 3.7 | 110 | 2,670 |
| $Fe_2O_3$, 32.6; MnO, 27; ZnO, 24.4 (in mol percent) | 2,500 | 4 | 100 | 1,425 | 3,650 | 3.3 | 83 | 1,420 |

H denotes hysteresis loss in the following Jordan's formula:

$$R/L = H.NI/l.(f/800) + Fn(800)^2 + t(f/800)$$

where,
R: Total loss
L: Inductance
N: Total turns
I: Electric current made to flow through the winding (A)
l: Length of the magnetic path (cm.)
f: Frequency (c./s.)
Fn: Eddy current loss
t: Residual loss As shown in the table, manganese-zinc ferrites having high permeabilities as compared with manganese-zinc ferrites now on the market, are easily obtained by sintering at low temperatures. The electrical resistance, however, is extremely small, the specific resistance being 1–2 ohm-cm. As a result, the eddy current loss becomes large, and the value of $1/\mu Q$ at 100 kc. is extremely large. Therefore, these ferrites can scarcely be used in a magnetic core for high-frequency use.

In order to prevent the lowering of Q, it has already been proposed to add calcium oxide to high-purity raw materials. It is alleged that a specific resistance of several hundred ohm-centimeters may thereby be attained. According to our experiments, however, the results of the addition of calcium oxide to the above-mentioned high-purity raw materials, are not favorable. In our experiments, 0–1% calcium oxide was added to the highly pure raw materials of a composition consisting of ferric oxide 54 mol percent, manganese oxide 35 mol percent, and zinc oxide 11 mol percent, and the ferrite was sintered in a highly pure nitrogen atmosphere at 1200° C. for four hours. The sintered ferrite was then cooled to 400° C. for nine hours in an oven, and thereafter cooled in air to normal temperature. The effect of the addition of calcium oxide on the specified electrical resistance is, as shown in FIG. 1, comparatively small. Although the addition of calcium oxide is more or less effective with respect to Q at 3 milli-oersted and 100 kc., as shown in FIG. 2, it shows a detrimental effect on $\mu$ at 3 milli-oersted and 100 kc., as shown in FIG. 3. Although the value of $1/\mu Q$ at 3 milli-oersteds and 100 kc. has been improved to a certain extent as compared with that of a ferrite in which calcium oxide is not added, the value still fails in satisfying the characteristics required in present-day communication apparatus, as shown in FIG. 4.

According to our other experiments which were carried out in a similar manner, and by adding, in place of calcium oxide, in an amount of 0.01–1%, one of the oxides of lithium, sodium, potassium, copper, beryllium, magnesium, strontium, cadmium, barium, boron, aluminum, yttrium, indium, lanthanum, cerium, samarium, silicon, titanium, germanium, zirconium, tin, lead, thorium, vanadium, arsenic, niobium, antimony, tantalum, bismuth, chromium, molybdenum, tungsten, cobalt, and nickel, it has been found, however, that the value of $1/\mu Q$ could not be improved to a large extent by the addition of only one of the oxides.

This invention resulted from various types of experiments to minimize the value of $1/\mu Q$, while preserving the excellent characteristics of a high-purity material, through the effect of combined addition of relatively small amounts of more than two kinds of addition materials. The invention will now be more fully described by reference to examples thereof.

By way of example, the experimental results of the effect of a combined addition of a small quantity of calcium oxide and a trace of silicon dioxide on a manganese-zinc ferrite, will be described for the case where 0.1–0.7% of calcium oxide and 0.01–0.07% of silicon dioxide is added to the composition of the above-mentioned highly pure raw materials consisting of ferric oxide 54 mol percent, manganese oxide 35 mol percent, and zinc oxide 11 mol percent, and as prepared in the manner mentioned above, and where the ferrite of the above-mentioned composition is sintered at 1200° C. in an atmosphere of nitrogen of extremely high purity, for four hours. The sintered ferrite was then cooled to 400° C. for nine hours in an oven, and thereafter cooled in air to normal temperature. Also, experimental results will be described to show the effect of the addition of a trace of silicon dioxide on a manganese ferrite which comprises as the main components the above-mentioned highly pure ferric oxide 54 mol percent, manganese oxide 35 mol percent, and zinc oxide 11 mol percent, and as the auxiliary component, 0–0.1% of silicon dioxide, and which is sintered at 1200° C. in an atmosphere of highly pure nitrogen, for four hours.

Figure 6:
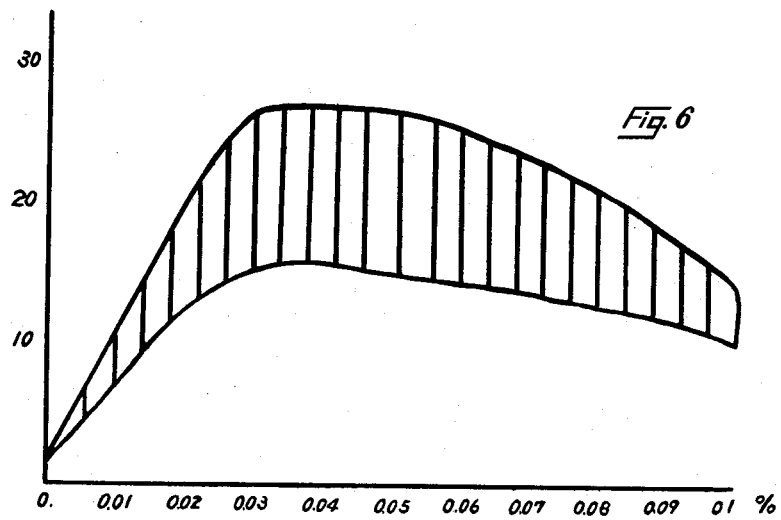
FIG. 6 shows characteristic curves of the effect of silicon dioxide additions only on the specific D.C. electric resistance of such ferrite.

As shown in FIG. 5, which shows variation of specific electrical resistance for various contents of calcium oxide and silicon dioxide, it will be evident that the combined effect of a small quantity of calcium oxide and a trace of silicon dioxide is extremely powerful on the specific electrical resistance of the manganese-zinc ferrite, when compared with FIGS. 1 and 6, which show the effects of adding calcium oxide only, and silicon dioxide only, to the same main composition, respectively.

Figure 7:
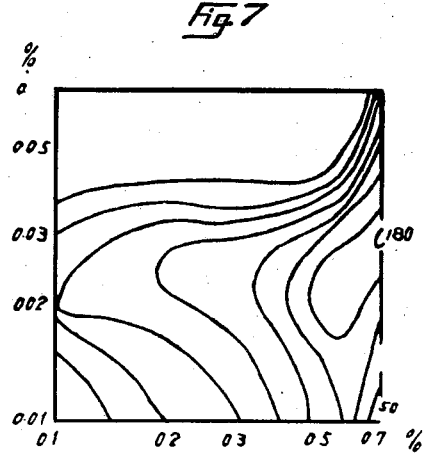
FIG. 7 shows characteristic curves of the effect of combined additions of silicon dioxide and calcium oxide on the Q of such ferrite.
Figure 8:
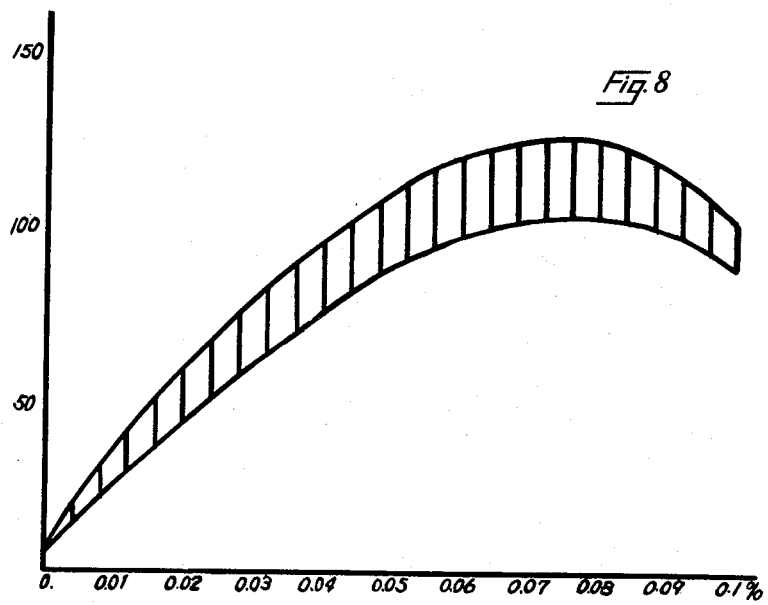
FIG. 8 shows characteristic curves of the effect of silicon dioxide additions only on the Q of such ferrite.

As shown in FIG. 7, which shows variation in $\mu$ at 3 milli-oersteds and 100 kc. due to combined addition of calcium oxide and silicon dioxide in various amounts, it will be readily seen that the combined effect of a small quantity of calcium oxide and a trace of silicon dioxide is effective, as compared with FIGS. 2 and 8, which show the effects of adding only either calcium oxide or silicon dioxide, respectively, to the same main composition. Although a high value of Q is obtained, as shown in FIG. 2, by the addition of calcium oxide only, lowering in the value of $\mu$ is considerable, as mentioned previously, with the result that favorable characteristics of $1/\mu Q$ are not obtainable in this case. According to the present invention, sufficiently high Q characteristics can be obtained even in a range in which the addition of calcium oxide is so small that the lowering in the value of $\mu$ can hardly be observed. As a result, it is possible, according to this invention, to prepare a manganese-zinc ferrite of excellent $1/\mu Q$ characteristics.

Figure 9:
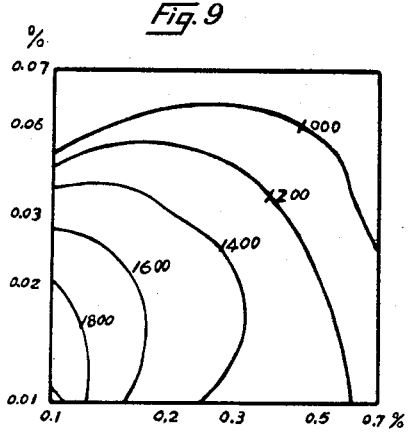
FIG. 9 shows characteristic curves of the effect of the combined additions of both silicon dioxide and calcium oxide on the permeability of such ferrite.

The variation in $\mu$ at 3 milli-oersteds and 100 kc. of the present ferrite, is shown in FIG. 9. As seen in FIG. 10, which shows the case of adding silicon dioxide only to the same main composition, quite a slight addition of silicon dioxide causes increase in $\mu$, contrary to the result illustrated in FIG. 3, which shows a case of adding calcium oxide only to the same composition. In a case where a combination of calcium oxide and silicon dioxide is added, deterioration in $\mu$ due to calcium oxide is prevented by the presence of silicon dioxide, where the addition of calcium oxide is less than 0.2%. It is, therefore, possible in accordance with the present invention, to maintain a comparatively high permeability and also to obtain a high value of Q, as mentioned previously.

Figure 11:
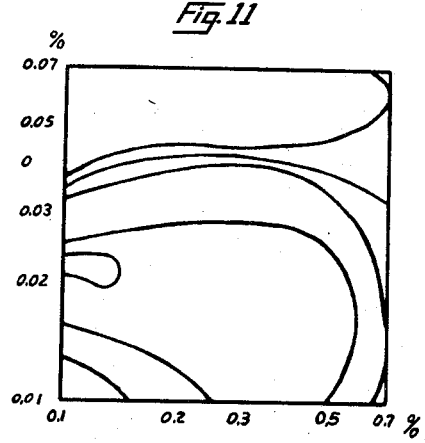
FIG. 11 shows characteristic curves of the effect of combined addition of both silicon dioxide and calcium oxide on $1/\mu Q$ of such ferrite.

As shown in FIG. 11, which shows variation in the value of $1/\mu Q$ of the present ferrite of the invention, it will be evident that the ferrite of the present invention is superior to that of FIG. 4, which shows a case of adding calcium oxide only to the same main composition of main components, or to that of FIG. 12, which shows a case of adding silicon dioxide only thereto.

It has also been found that in a manganese-zinc ferrite containing calcium oxide and silicon dioxide, with less than 0.05% of calcium oxide and less than 0.005% of silicon dioxide do not give appreciable improvement; more than 0.3% of calcium oxide results in large hysteresis loss, and more than 0.035% of silicon dioxide results in large crystal size, poor $1/\mu Q$, and sudden deterioration of the hysteresis loss.

The present invention is effective not only in the above-mentioned composition, but also to compositions differing therefrom. Table 2 shows variations of $\mu$, Q, and $1/\mu Q$, when adding 0.1% calcium oxide only, 0.02% silicon dioxide only, and 0.1% calcium oxide plus 0.02% silicon dioxide, respectively, to a ferrite of the composition consisting of 53.5 mol percent ferric oxide, 30 mol percent manganese oxide, and 16.5% of zinc oxide. As shown in this table, similar results can be obtained even if the fundamental composition be varied.

Table 2

| Characteristics | Addition | | | |
|---|---|---|---|---|
| | None | CaO, 0.1 percent | SiO₂, 0.02 percent | CaO, 0.1 percent SiO₂, 0.02 percent |
| $\mu$ | 2,200 | 2,100 | 2,300 | 2,200 |
| Q | 4.3 | 25 | 40 | 110 |
| $1/\mu Q \times 10^6$ | 106 | 19 | 10.8 | 4.1 |

Table 3 shows a series of different compositions of manganese-zinc ferrites to which either 0.1% of calcium oxide or 0.01% of silicon dioxide, or both, have been added. Table 4 shows the effect of sintering each of these different compositions in a pure nitrogen atmosphere at 1200° C. for four hours, followed by cooling down to 400° C. in nine hours, followed by abrupt removal into air of normal temperature.

Table 3
Composition

| Sample No. | MnO, mol percent | Fe₂O₃, mol percent | ZnO, mol percent |
|---|---|---|---|
| 1 | 25 | 52 | 23 |
| 2 | 25 | 53 | 22 |
| 3 | 25 | 54 | 21 |
| 4 | 25 | 55 | 20 |
| 5 | 27 | 52 | 21 |
| 6 | 27 | 53 | 20 |
| 7 | 27 | 54 | 19 |
| 8 | 27 | 55 | 18 |
| 9 | 29 | 52 | 19 |
| 10 | 29 | 53 | 18 |
| 11 | 29 | 54 | 17 |
| 12 | 29 | 55 | 16 |
| 13 | 31 | 52 | 17 |
| 14 | 31 | 53 | 16 |
| 15 | 31 | 54 | 15 |
| 16 | 31 | 55 | 14 |
| 17 | 33 | 52 | 15 |
| 18 | 33 | 53 | 14 |
| 19 | 33 | 54 | 13 |
| 20 | 33 | 55 | 12 |
| 21 | 35 | 52 | 13 |
| 22 | 35 | 53 | 12 |
| 23 | 35 | 55 | 10 |
| 24 | 37 | 52 | 11 |
| 25 | 37 | 53 | 10 |
| 26 | 37 | 54 | 9 |
| 27 | 37 | 55 | 8 |

Table 4

| Condition | Characteristics | Additive | | | |
|---|---|---|---|---|---|
| | | None | CaO, 0.1 weight percent | SiO₂, 0.01 weight percent | CaO, 0.1 weight percent; SiO₂, 0.01 weight percent |
| 1 | $\mu$ | 3,050 | 2,800 | 3,450 | 3,250 |
| | Q | 4 | 25 | 20 | 61 |
| 2 | $\mu$ | 3,750 | 3,500 | 4,050 | 3,600 |
| | Q | 3 | 18 | 14 | 55 |
| 3 | $\mu$ | 2,700 | 2,500 | 3,000 | 2,700 |
| | Q | 3 | 16 | 12 | 52 |
| 4 | $\mu$ | 1,800 | 1,700 | 2,000 | 1,850 |
| | Q | 3 | 14 | 12 | 60 |
| 5 | $\mu$ | 2,800 | 2,650 | 3,200 | 3,050 |
| | Q | 4.5 | 30 | 23 | 72 |
| 6 | $\mu$ | 3,350 | 3,200 | 3,700 | 3,300 |
| | Q | 3 | 22 | 16 | 66 |
| 7 | $\mu$ | 2,450 | 2,300 | 2,700 | 2,400 |
| | Q | 2.5 | 20 | 15 | 63 |
| 8 | $\mu$ | 1,500 | 1,500 | 1,850 | 1,650 |
| | Q | 2.5 | 19 | 14 | 58 |
| 9 | $\mu$ | 2,600 | 2,450 | 2,850 | 2,551 |
| | Q | 5 | 34 | 27 | 81 |
| 10 | $\mu$ | 3,100 | 2,900 | 3,450 | 3,000 |
| | Q | 4 | 27 | 18 | 75 |
| 11 | $\mu$ | 2,400 | 2,250 | 2,700 | 2,400 |
| | Q | 4 | 24 | 17 | 65 |
| 12 | $\mu$ | 1,600 | 1,500 | 1,850 | 1,650 |
| | Q | 4 | 24 | 17 | 57 |
| 13 | $\mu$ | 2,050 | 1,900 | 2,250 | 2,100 |
| | Q | 6 | 38 | 30 | 90 |
| 14 | $\mu$ | 2,450 | 2,300 | 2,700 | 2,450 |
| | Q | 5 | 32 | 24 | 87 |
| 15 | $\mu$ | 2,150 | 2,050 | 2,450 | 2,200 |
| | Q | 4 | 29 | 20 | 85 |
| 16 | $\mu$ | 1,500 | 1,450 | 1,780 | 1,550 |
| | Q | 4 | 27 | 18 | 77 |
| 17 | $\mu$ | 1,700 | 1,600 | 1,900 | 1,750 |
| | Q | 7 | 42 | 34 | 102 |
| 18 | $\mu$ | 2,000 | 1,900 | 2,250 | 2,100 |
| | Q | 5 | 34 | 26 | 99 |
| 19 | $\mu$ | 1,950 | 1,900 | 2,200 | 2,100 |
| | Q | 4 | 29 | 22 | 76 |
| 20 | $\mu$ | 1,500 | 1,450 | 1,600 | 1,550 |
| | Q | 4 | 29 | 22 | 52 |
| 21 | $\mu$ | 1,300 | 1,250 | 1,500 | 1,350 |
| | Q | 8 | 46 | 40 | 108 |
| 22 | $\mu$ | 1,650 | 1,550 | 1,800 | 1,700 |
| | Q | 5 | 38 | 31 | 107 |
| 23 | $\mu$ | 1,200 | 1,150 | 1,250 | 1,200 |
| | Q | 5 | 30 | 26 | 90 |
| 24 | $\mu$ | 1,200 | 1,150 | 1,250 | 1,200 |
| | Q | 10 | 50 | 46 | 120 |
| 25 | $\mu$ | 1,550 | 1,450 | 1,700 | 1,600 |
| | Q | 6 | 40 | 36 | 111 |
| 26 | $\mu$ | 1,800 | 1,700 | 1,950 | 1,850 |
| | Q | 5 | 32 | 30 | 105 |
| 27 | $\mu$ | 1,150 | 1,100 | 1,200 | 1,150 |
| | Q | 5 | 30 | 28 | 110 |

The data of Tables 3 and 4 establish that throughout the wide ranges of variation of the basic manganese-zinc ferrite compositions, the desired effect of increased permeability and decreased hysteresis losses remains unchanged, in contrast with the effect of only the calcium oxide or only the silicon dioxide addition. Furthermore, the desired effect of increased permeability and decreased hysteresis losses over this wide range of manganese-zinc ferrite compositions is retained even if their sintering condition is changed. For example, a manganese-zinc ferrite composition consisting of ferric oxide 53.5 mol percent, manganese oxide 30.0 mol percent, and zinc oxide 16.5 mol percent, was combined with three different additions of either 0.02% silicon dioxide, or 0.1% calcium oxide, or with both 0.02% silicon dioxide and 0.1% calcium oxide, and each of these three different ferrite compositions was sintered under each of the following series of different sintering conditions:

| | | °C. | Hours | |
|---|---|---|---|---|
| 1 | In pure nitrogen atmosphere. | 1,200 | 4 | Cooled to 400° C. for 9 hours and taken out into the air. |
| 2 | do | 1,200 | 4 | Cooled to 200° C. for 13 hours and taken out into the air. |
| 3 | do | 1,200 | 4 | Cooled to 100° C. for 17 hours and taken out into the air |
| 4 | do | 1,200 | 2 | Cooled to 400° C. for 9 hours and taken out into the air. |
| 5 | do | 1,200 | 6 | Do. |
| 6 | do | 1,220 | 4 | Do. |
| 7 | Pure nitrogen atmosphere. | 1,250 | 4 | Do. |
| 8 | Nitrogen atmosphere containing 0.2% oxygen. | 1,200 | 4 | Do. |
| 9 | do | 1,200 | 4 | Cooled to 100° C. in 17 hours and taken out into the air. |
| 10 | Nitrogen atmosphere containing 0.4% oxygen. | 1,200 | 4 | Do. |
| 11 | do | 1,250 | 4 | Do. |

Table 5 below shows the effect on the permeability and hysteresis losses of these three different ferrite compositions caused by each of the series of different sintering conditions:

the effect of the combined addition of the present invention is.

Table 7

| $\mu$ at 3 milli-oersted, 100 kc. | Q at 3 milli-oersted, 100 kc. | $1/\mu Q$ at 3 milli-oersted, 100 kc. | $H/\mu^2$ at 10-30 millioersted, 100 kc. | Bs at 40 milli-oersted | Tc (°C) | $\Delta\mu/\mu^2/°C$ (0-40°C) |
|---|---|---|---|---|---|---|
| 2,150 | 210 | $2.2 \times 10^{-6}$ | $250 \times 10^{-6}$ | 4,700 | 230 | $8 \times 10^{-7}$ |

Table 5

| Condition | Characteristics | Additive |||| 
|---|---|---|---|---|---|
| | | None | CaO, 0.1 weight percent | SiO$_2$, 0.02 weight percent | CaO, 0.1 weight percent; SiO$_2$, 0.01 weight percent |
| 1 | $\mu$ | 2,200 | 2,100 | 2,300 | 2,200 |
|   | Q | 4.3 | 25 | 40 | 110 |
| 2 | $\mu$ | 2,350 | 2,150 | 2,500 | 2,350 |
|   | Q | 4.1 | 26 | 36 | 102 |
| 3 | $\mu$ | 2,400 | 2,200 | 2,550 | 2,400 |
|   | Q | 4 | 24 | 35 | 100 |
| 4 | $\mu$ | 1,950 | 1,800 | 2,100 | 2,000 |
|   | Q | 4.4 | 25 | 41 | 118 |
| 5 | $\mu$ | 2,350 | 2,200 | 2,500 | 2,400 |
|   | Q | 4.1 | 25 | 36 | 105 |
| 6 | $\mu$ | 2,350 | 2,250 | 2,550 | 2,350 |
|   | Q | 3.9 | 22 | 37 | 95 |
| 7 | $\mu$ | 2,800 | 2,550 | 2,950 | 2,750 |
|   | Q | 3.4 | 19 | 25 | 91 |
| 8 | $\mu$ | 2,200 | 2,100 | 2,350 | 2,250 |
|   | Q | 5 | 32 | 49 | 145 |
| 9 | $\mu$ | 2,300 | 2,200 | 2,500 | 2,300 |
|   | Q | 4.7 | 30 | 42 | 122 |
| 10 | $\mu$ | 2,200 | 2,100 | 2,300 | 2,200 |
|    | Q | 6.2 | 40 | 59 | 202 |

Although the permeability and hysteresis loss characteristics of these ferrite compositions are affected by the sintering condition, the effect of the sintering conditions is minimized for ferrite compositions of the invention containing combined additions of silicon dioxide and calcium oxide. In other words, the unique, desirable effect of the combined specified addition of both silicon dioxide and calcium oxide to the specified manganese-zinc ferrite composition, is substantially unaffected by changes in sintering conditions.

Although it has been known to add oxides of aluminum, tin, and titanium for the purpose of improving the temperature coefficient of permeability of manganese-zinc ferrites, the effect of the present invention is unaffected by the existence of these added materials. For example, the effect of the combined additions of the present invention for a ferrite having the composition, ferric oxide 54 mol percent, manganese oxide 35 mol percent, and zinc oxide 11 mol percent, with the further addition of 0.5% of titanium oxide, is as shown in Table 6 below:

Table 6

| Characteristics | Addition ||||
|---|---|---|---|---|
| | TiO$_2$, 0.5 percent | TiO$_2$, 0.5 percent CaO, 0.1 percent | TiO$_2$, 0.5 percent SiO$_2$, 0.02 percent | TiO$_2$, 0.5 percent CaO, 0.1 percent, SiO$_2$, 0.2 percent |
| $\mu$ | 1,700 | 1,700 | 1,850 | 1,800 |
| Q | 25 | 45 | 40 | 170 |
| $1/\mu Q \times 10^6$ | 23.6 | 13.2 | 13.5 | 3.3 |

Thus it is possible to manufacture manganese-zinc ferrites of excellent quality by suitably adjusting the quantity of addition materials, sintering atmosphere, and sintering temperature. For example, the characteristics of a manganese-zinc ferrite having the composition ferric oxide 54.1 mol percent, manganese oxide 35 mol percent, zinc oxide 11.9 mol percent, to which 0.6% stannic oxide, 0.1% calcium oxide, 0.26% silicon dioxide, are added, and which is sintered at 1250° C. for four hours in an atmosphere of nitrogen containing 0.4% oxygen, are shown in Table 7 below. It will be evident from this how great the effect of the combined addition of the present invention is.

In Table 7, Bs denotes magnetic flux, Tc the Curie point, and $\Delta\mu/\mu^2/°$ C. the rate of change of permeability $\mu$ per unit $\mu$ and unit temperature difference.

It is to be understood that in adding calcium oxide and silicon dioxide to the main components of a manganese-zinc ferrite, any compounds of calcium and silicon may be used, as long as they are salts that become calcium oxide and silicon dioxide in the final sintering stage. Also, the additions may be combined at any stage of the ferrite-forming process as long as it is prior to the final sintering stage.

It should be understood that the symbols used for designating the characteristics of the ferrite compositions described herein, have their conventional meanings, namely, $\mu$ means the permeability; Q means the ratio of the inductive reactance to the effective series resistance; kc means the frequency of the alternating current in kilocycles per second; H means the field strength.

It will be apparent to those skilled in the art that the novel principles of the invention disclosed herein in connection with specific exemplifications thereof, will suggest various other modifications and applications of the same. It is accordingly desired that in construing the breadth of the appended claims, they shall not be limited to the specific exemplifications of the invention described herein.

We claim:

1. A sintered manganese-zinc ferrite composition consisting essentially of 52 to 55 mol percent of Fe$_2$O$_3$, 25 to 37 mol percent of MnO and 23 to 8 mol percent of ZnO, and also combining the two additions consisting of 0.05% to 0.3% by weight of calcium oxide and 0.005% to 0.035% by weight of silicon dioxide, whereby the permeability and hysteresis losses of said ferrite composition are materially increased and decreased above and below, respectively, the permeability and hysteresis losses of the same composition containing only one of said two additions.

2. A sintered ferrite composition as claimed in claim 1, containing at most .001% by weight of impurities.

3. A sintered ferrite composition as claimed in claim 1, containing at most 0.5% by weight of TiO$_2$.

4. A sintered ferrite composition as claimed in claim 1, containing at most 0.6% by weight of stannic oxide.

5. A sintered ferrite composition as claimed in claim 1, containing at most 0.5% by weight of TiO$_2$ and at most 0.6% by weight of stannic oxide.

6. In a process of making a ferrite of minimum magnetic retentivity and low hysteresis losses as measured by $1/\mu Q$ of such ferrite, the steps comprising preparing a mixture of ferrite ingredients which upon sintering form a ferrite composition consisting essentially of 52 to 55 mol percent of Fe$_2$O$_3$, 25 to 37 mol percent of MnO and 23 to 8 mol percent of ZnO, and also containing two addition ingredients which in the sintered ferrite consist of 0.05% to 0.3% by weight of calcium oxide and 0.005% to 0.035% by weight of silicon dioxide, and sintering the mixture of all these ingredients in a neutral gas atmosphere at temperatures in the range of 1200° C. to 1250° C.

References Cited in the file of this patent

UNITED STATES PATENTS

| 2,903,429 | Guillaud | Sept. 8, 1959 |
| 2,924,573 | Sasaki et al. | Feb. 9, 1960 |
| 2,992,990 | Parker | July 18, 1961 |